(12) United States Patent
Koo

(10) Patent No.: US 6,285,162 B1
(45) Date of Patent: Sep. 4, 2001

(54) CONTROLLED METHOD FOR BATTERY CHARGING IN ELECTRIC VEHICLE FOR IMPROVING BATTERY LIFE

(75) Inventor: Jae-Seung Koo, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/471,248

(22) Filed: Dec. 23, 1999

(30) Foreign Application Priority Data

Oct. 11, 1999 (KR) .................................................. 99-43758

(51) Int. Cl.$^7$ .................................................. H01M 10/44
(52) U.S. Cl. ........................................... 320/132; 320/162
(58) Field of Search .................................... 320/127, 128, 320/132, 134, 136, 150, 152, 157, 159, 162

(56) References Cited

U.S. PATENT DOCUMENTS 4,392,101 * 7/1983 Saar et al. .
5,698,967 * 12/1997 Baer et al. .

* cited by examiner

*Primary Examiner*—Edward H. Tso

(57) ABSTRACT

A method for controlling charging the battery of an electric vehicle, wherein upon commencement of charging, a current charged state of a battery is measured to calculate an anticipated charging current to enable the completion of the battery charging. The degree of an undercharged state is determined in consideration of current battery aging to overcharge the battery as much as the undercharge, thereby preventing a battery performance degradation caused by continuous undercharging. A battery aging state in consideration of battery cycling is determined to increase calculation accuracy of the battery charging state, to thereby improve a running distance of the electric vehicle by maintaining an initial charge state.

9 Claims, 3 Drawing Sheets

CONTROLLED METHOD FOR BATTERY CHARGING IN ELECTRIC VEHICLE FOR IMPROVING BATTERY LIFE

BACKGROUND OF THE INVENTION

1. Field of the Invention

The present invention relates to an electric vehicle, and more particularly to a controlling method for charging the battery of an electric vehicle adapted to determine a charge state of a battery before charging when a battery used as power source for an electric vehicle is charged relative to an anticipated a current is charge up to a charge end time; and the antisipated current is compared with an actual input current for determining of degree of undercharge and for performance of overcharge, thereby determining a progressive state of aging in the battery.

2. Description of the Prior Art

An electric vehicle is generally constructed with a motor (electric motor), a controller, an inverter, a charger, a DC/DC converter and a battery.

The electric vehicle, unlike the gasoline-powered vehicle, utilizes a limited modularized energy in the battery for running a vehicle, such that, when the limited energy of battery is consumed, the battery should be charged by an external power source. A general battery charging method includes a full power mode, a constant current control first mode, a constant current control second mode, a refresh charge control mode for maintaining 100% charge control state and a battery control mode.

A battery discharging method includes a state of charging calculation, a battery fail check, a projection mode and a battery temperature control mode.

Each control mode compensates for battery aging, based on an initially designed value. When an electric vehicle runs fast according to the control method, a problem occurs in defining one cycle of charge and discharge of a battery. Therefore, one cycle of charge and discharge in a battery is defined when the current battery charge state is above 85% charging capacity and over 2 hours of charging time.

Accordingly, as the battery cycle of an electric vehicle progresses, a charged state against an initial capacity is expressed as a predetermined value of capacity decrease.

In other words, the cycling is defined as a factor influencing a battery aging factor and can be expressed as a battery aging factor.

However, there is a problem in the aforementioned definition of cycling in that an internal resistance change in an electric vehicle battery cannot be positively monitored, thereby making it impossible to charge with actually useable energy, such that a running distance of an electric vehicle is soon shortened to thereby decreased vehicle performance.

The present invention solves the aforementioned problems and it is an object of the present invention to provide a controlling method for carrying the battery of an electric vehicle, where a present charge state is measured, in at the initiation of charging a battery of electric vehicle, to calculate an anticipated current per hour up to an end of charging and to determine the degree of undercharge in consideration of present battery aging for overcharging the under charged battery, thereby preventing an early degradation of vehicle performance.

In accordance with the object of the present invention, there is provided a controlling method for battery charge of an electric vehicle, the method comprising the steps of:

measuring a battery charge state before starting battery charging to calculate an anticipated current for charging and to output a control signal for charging a battery according to a predetermined charge control program;

determining when the charge has been completed after the charging is started; by comparing the anticipated charge current with an actual charging current to determine whether the actual charging current is larger than the anticipated charging current if;

terminating charging if it is determined that the actual charged current is larger than the anticipated charge current;

outputting an overcharge control signal if it is determined that the actual charging current is smaller than the anticipated charging current, and comparing whether voltage of the battery is larger than a maximum voltage to calculate a total charged current, and terminating charging after calculating a battery aging progress state, if it is determined that the battery voltage is larger than the maximum voltage;

checking a battery voltage drop if it is determined that the battery voltage is smaller than the maximum voltage to calculate a total charged current, if it is determined that the voltage drop has occurred in order to calculate a battery aging progress state for completion of charging;

comparatively determining whether a temperature rise rate of the charged battery is larger than a randomly established maximum temperature rise reference value, if it is determined that the voltage drop has not occurred in order to calculate a total charged current, if it is determined that the temperature rise rate of the charged battery is larger than the randomly established maximum temperature rise reference value, and to thereby calculate a battery aging progress state for completion of charging;

comparatively determining whether an actual temperature of a charged battery is larger than a randomly established maximum temperature, if it is determined that the temperature rise rate of the charged battery is smaller than the randomly established maximum temperature rise reference value to calculate a total charged current if it is determined in order that the actual temperature of the charged battery is larger than the randomly established maximum temperature, to thereby calculate a battery aging progress state for completion of the charging;

determining whether charged current per hour is larger than a randomly established maximum charged reference current if it is determined that the actual temperature of the charged battery is smaller than the randomly established maximum temperature to calculate a total charged current, if it is determined that the charged current per hour is larger than the randomly established maximum charged reference current, to thereby and to calculate a battery aging progress state for completion of the charging; and determining that the battery charge is not completed by a battery charge control unit, if it is discriminated that the charged current per hour is smaller than the randomly established maximum charge reference current to output an overcharge control signal for continuously performing the charging.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE INVENTION

Figure 1:
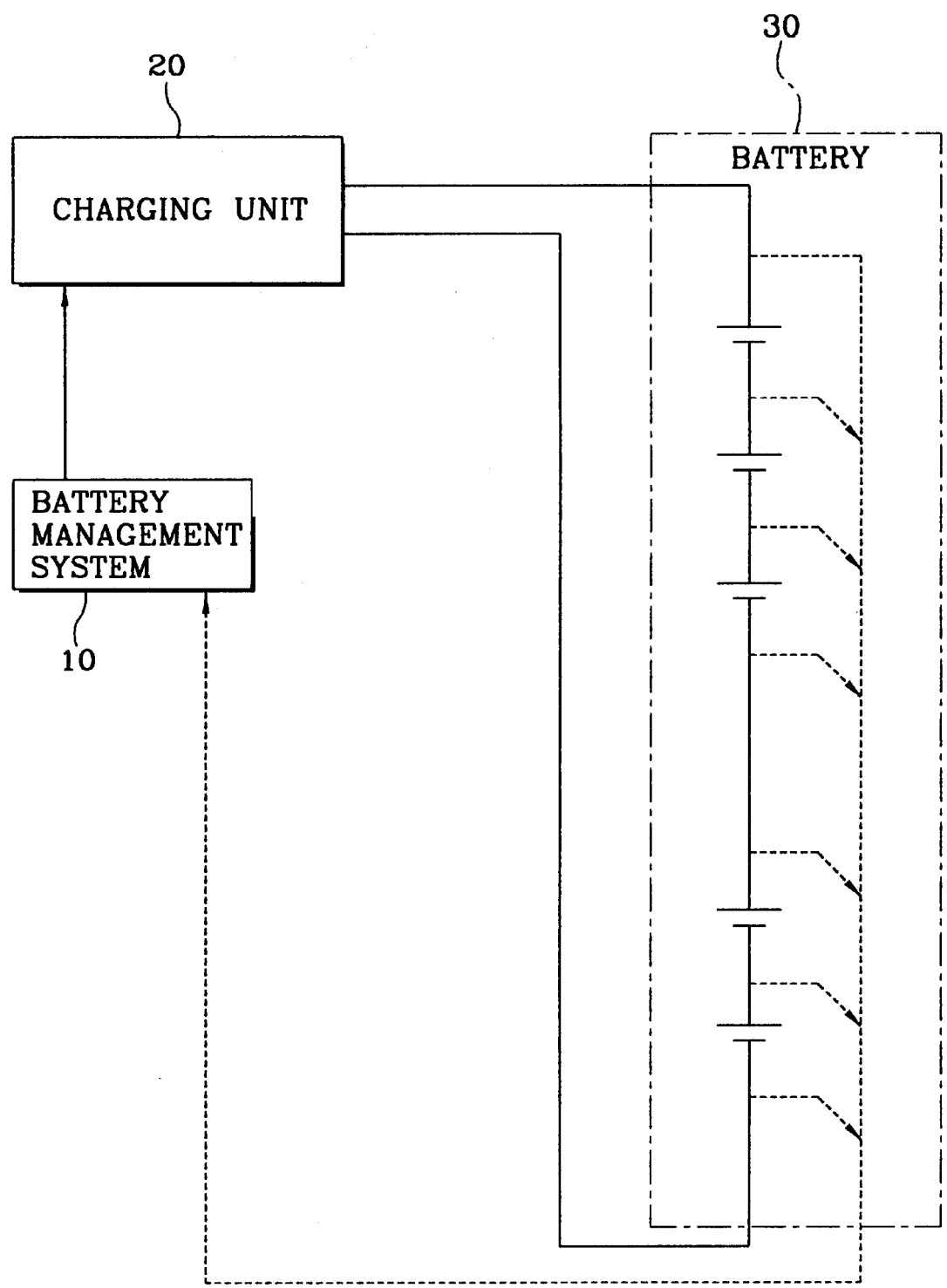
FIG. 1 is schematic block diagram for illustrating a structure of a battery charging device of an electric vehicle according to the present invention.

FIG. 1 is a schematic block diagram for illustrating a structure of a battery charging device of an electric vehicle according to the present invention, where the charging device of an electric vehicle includes a battery management system (BMS) 10, a charging unit 20 and a battery 30.

The BMS 10 serves to measure a battery state to output a control signal for charging the battery 30. The battery charging unit 20 converts a power input from outside to a direct current DC power source to output an electric signal for battery charge when a switch (S) is turned on.

Figure 2A:
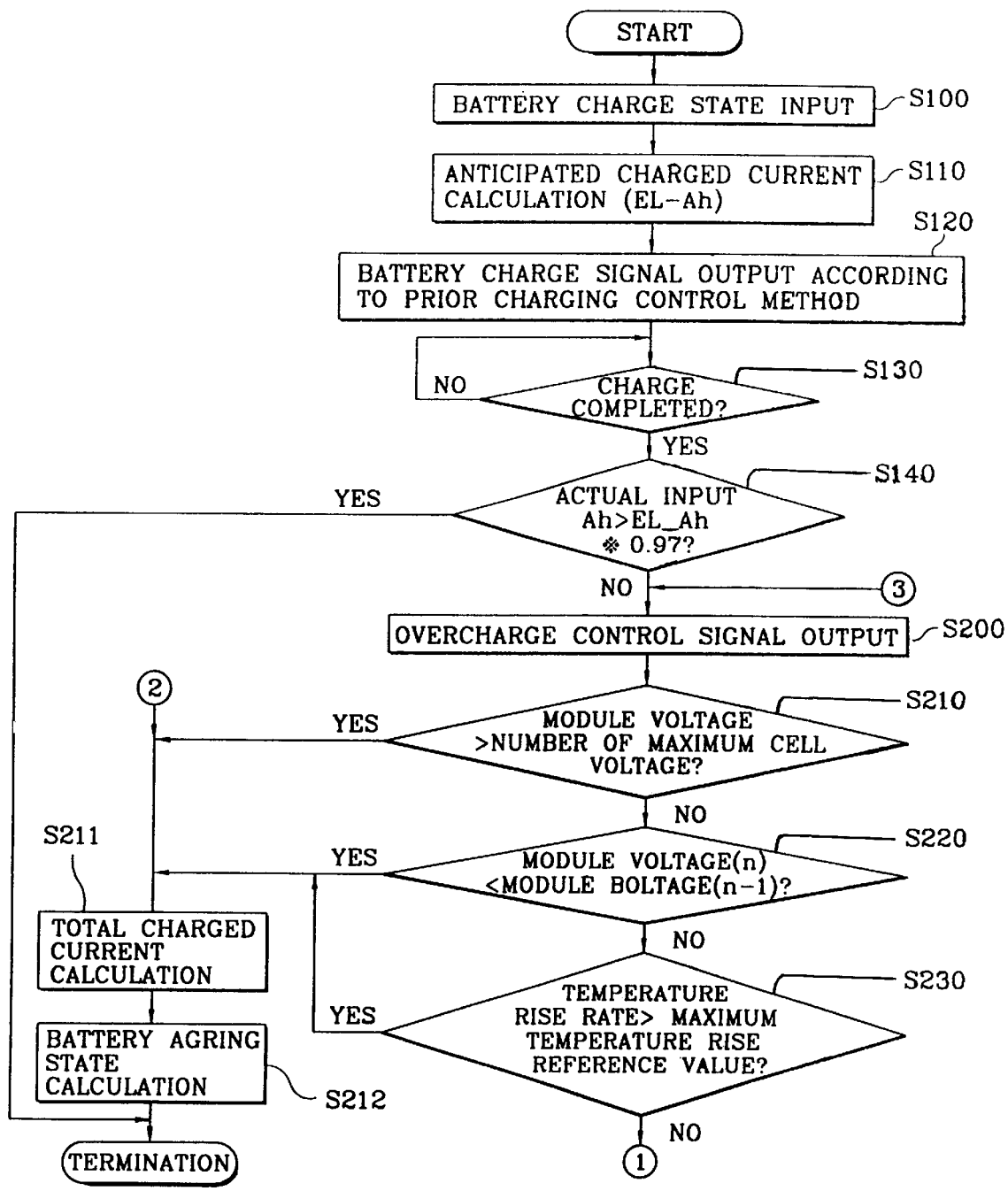
FIGS. 2a & 2b are an operational flow chart of a battery charging method of an electric vehicle according to the present invention.
Figure 2B:
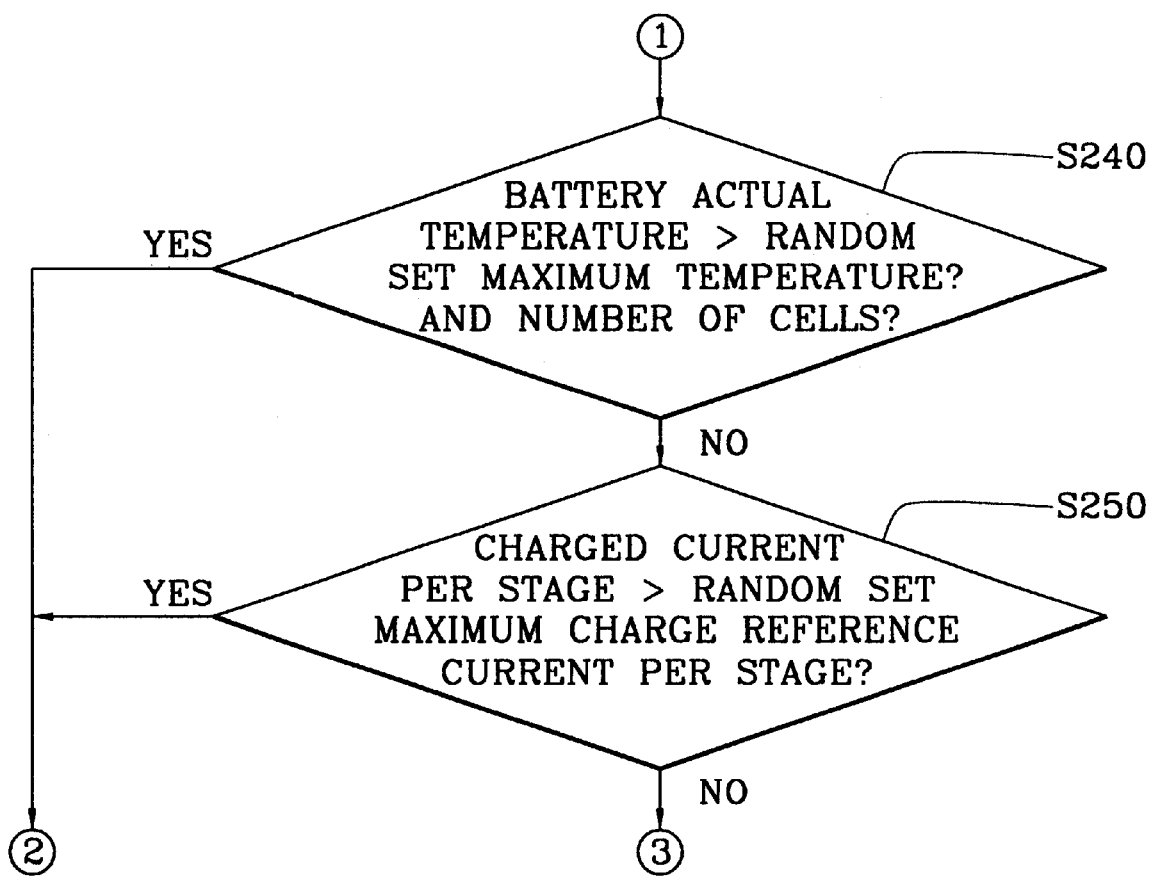

Now, a charging method of the battery charging unit of electric vehicle thus constructed will be described with reference to FIG. 2, where prefix symbol S defines a step.

When charging is started for the battery of electric vehicle, the battery management system 10 receives a present battery charge state before the start of the battery charge, step S10.

Successively, the BMS 10 calculates an anticipated charging current (EL_Ah) of a to-be charged battery according to input battery charge state, a randomly established initial value and a battery aging state detected and stored erstwhile, step S110.

The BMS 10 outputs to the charging unit 20 a charging control signal for charging the battery according to a predetermined battery charge control program, step S120.

The charging unit 20 is controlled by the control signal output from the BMS 10 to supply a charging current to the battery 30. successively, the BMS 10 discriminates whether charge of the battery 30 is completed according as battery charging starts, step S130.

The BMS 10 comparatively discriminates whether an actual charging current in the battery 30 is larger than an anticipated charge current if it is determined that the battery charge is completed, step S140, where the actual charge current Ah>anticipated charge current (EL_Ah), with an error of 0.97.

The BMS 10 determines that the battery charge has been completed to thereby terminate the battery charge if it is determined that the actual charging current is larger than the anticipated charging current, however, if the actual charging current is smaller than the anticipated charging current, the BMS 10 determines that the battery 30 is not charged to output to the charging unit 20 an overcharge control signal for battery charge, step S200.

Successively, the BMS 10 comparatively determines whether a battery module voltage (n) is larger than a maximum battery cell voltage operated by the number of battery cells in order to check a maximum battery module voltage state, step S210.

If it is determined that the battery module voltage (n) is larger than the maximum battery cell voltage operated by the number of battery cells, the BMS 10 calculates a total charged current in the battery 30, step S211, to calculate a battery aging state for completion of charging, step S212. The method of calculating the total charged current in the battery 30 is performed by adding the actual charging current to charged current input per stage.

Furthermore, the method of calculating the battery aging state is performed by dividing the calculated total charged current by a randomly established initial value.

However, if it is determined that the battery module voltage (n) is smaller than a maximum battery cell voltage operated by the number of battery cells, the BMS 10 determines whether the current battery module voltage (n) is smaller than the previous battery module voltage in order to detect a battery module voltage sudden drop phenomenon, step S220.

The BMS 10 determines that the battery module voltage sudden drop phenomenon has occurred if it is determined that the present battery module voltage (n) is smaller than the previous battery module voltage, to calculate a total charged current charged in the battery 30, step S211, to thereby calculate a battery aging state for termination of charging, step S212.

However, if it is determined that the present battery module voltage (n) is larger than the previous battery module voltage value, the BMS 10 determines whether temperature rise rate of charging battery is higher than a randomly established maximum temperature rise reference value to prevent a battery explosion due to over charge, step S230.

If it is determined that the temperature rise rate of the charging battery is higher than the randomly established maximum temperature rise reference value, the BMS 10 calculates a total current charged in the battery 30, step S211, to thereby calculate a battery aging state for completion of the charging, step S212.

However, if it is determined that the temperature rise rate of the charging battery is smaller than the randomly established maximum temperature rise reference value, the BMS 10 determines whether the actual temperature of the currently charging battery 30 is higher than the randomly established maximum temperature reference value, step S240.

If it is determined that the actual temperature of the currently charging battery 30 is larger than the randomly established maximum temperature reference value, the BMS 10 calculates a total current charged in the battery 30, step S211, to thereby calculate a battery aging for completion of charging, step S212.

However, if it is determined that the actual temperature of the presently charging battery 30 is smaller than the randomly established maximum temperature reference value, the BMS 10 comparatively determines whether charged current per stage is larger than a randomly established maximum charged current reference value per stage, step S250.

If it is determined that the charged current per stage is larger than the randomly established maximum charged current reference value per stage, the BMS 10 calculates a total current charged in the battery 30, step S211, to thereby calculate a battery aging for completion of charging, step S212.

However, if it is determined that the charged current per stage is smaller than the randomly established maximum charged current reference value, the BMS 10 determines that the battery 30 is not completely charged to return to the step S200 for outputting an overcharge control signal for continuously performing the charging, step S250.

As apparent from the foregoing, there is an advantage in the controlling method for battery charge of electric vehicle according to the present invention thus described in that, upon commencement of charging, a current charged state of a battery is measured to calculate an anticipated input current up until the completion of the battery charging. The degree of an undercharged state is evaluated in consideration of current battery aging to overcharge the battery as much as the undercharge, thereby preventing a battery performance degradation caused by the continuous undercharging. There is another advantage in that a battery aging state in consideration of battery cycling is discriminated to increase calculation accuracy of battery charging state and to thereby improve the running distance of the electric vehicle by maintaining an initial battery charge state.

What is claimed is:

1. A method for controlling the battery charge of an electric vehicle, the method comprising the steps of:

measuring a battery charge state before starting charging of the battery;

calculating an anticipated current for charging and outputting a control signal for charging a battery according to a predetermined charge control program;

determining whether charging should be completed after the charge is started by comparing the anticipated charging current with an actual charging current to determine whether the actual charging current is larger than the anticipated charging current; and terminating the charging if it is determined that the actual charging current is larger than the anticipated charging current.

2. The method as defined in claim 1, further comprising outputting an overcharge control signal if it is determined that the actual charging current is smaller than the anticipated charging current, and comparing whether a battery voltage is larger than a maximum voltage, to thereby calculate a total charging current and to terminate charging after calculating a battery aging progress state if it is determined that the battery voltage is larger than the maximum voltage.

3. The method as defined in claim 2, wherein the method of calculating battery aging is determined from a total charged current and an initially random established value.

4. The method as defined in claim 2, further comprising the step of checking for a batter voltage drop if it is determined that the battery voltage is smaller than the maximum voltage in order to calculate a total charged current, if it is determined that the voltage drop has occurred, to thereby calculate a battery aging progress state for controlling completion of charging.

5. The method as defined in claim 4, wherein the method of checking a battery voltage drop is by determining that the battery voltage drop has occurred if a battery voltage (n) is larger than a calculated value obtained by operating a maximum voltage of the battery.

6. The method as defined in claim 4, further comprising the step of comparatively determining whether a temperature rise rate of the charged battery is larger than a randomly established maximum temperature rise rate reference value, if it is determined that the voltage drop has not occurred in order to calculate a total charged current if it is determined that the temperature rise rate of the charged battery is larger than the randomly established maximum temperature rise rate reference value, to thereby calculate a battery aging progress state for controlling completion of charging.

7. The method as defined in claim 6, further comprising the step of comparatively determining whether an actual temperature of charged battery is larger than a randomly established maximum temperature, if it is determined that the temperature rise rate of the charged battery is smaller than the randomly established maximum temperature rise rate reference value in order to calculate a total charged current, if it is determined that the actual temperature rise rate of the charged battery is larger than the randomly established maximum temperature, to thereby calculate a battery aging progress state for controlling completion of charging.

8. The method as defined in claim 7, further comprising the step of determining whether charged current per hour is larger than a randomly established maximum charged reference current per hour, if it is determined that the actual temperature of the charged battery is smaller than the randomly established maximum temperature in order to calculate a total charged current, if it is determined that the charged current per hour is larger than the randomly established maximum charged reference current per hour, to thereby calculate a battery aging progress state for controlling completion of charging.

9. The method as defined in claim 8, further comprising the step of determining that the battery charge is not completed by a battery charge control unit, if it is determined that the charged current per hour is smaller than the randomly established maximum charge reference current per hour to output an overcharge control signal for continuously performing the charging.

* * * * *